Figure 1:
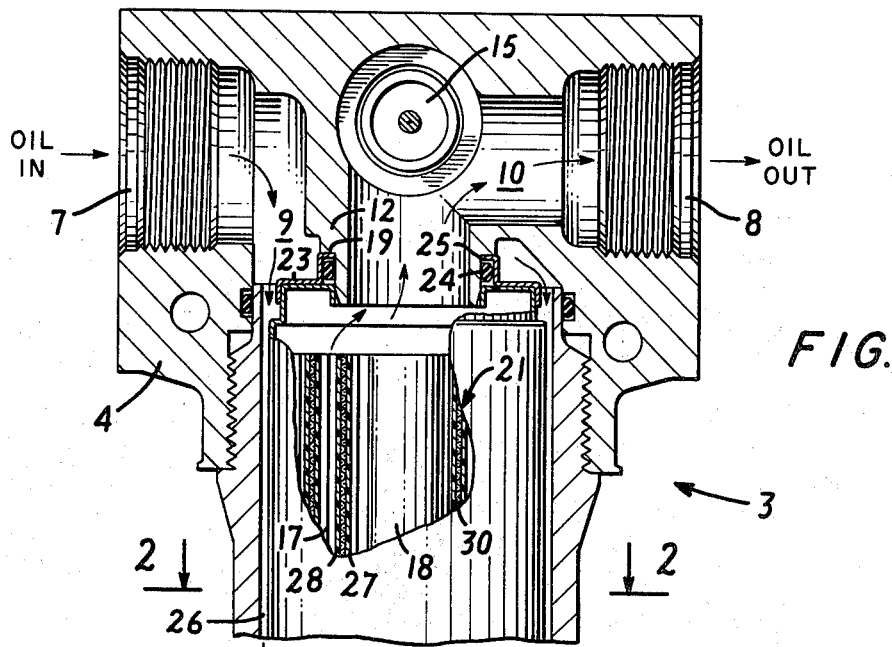

United States Patent
Gross

[15] 3,668,837
[45] June 13, 1972

[54] SEPARATOR OF THE SEMIPERMEABLE MEMBRANE TYPE

[72] Inventor: Robert I. Gross, Roslyn Hgts., N.Y.
[73] Assignee: Pall Corporation, Glen Cove, N.Y.
[22] Filed: Feb. 13, 1970
[21] Appl. No.: 11,236

[52] U.S. Cl..................................55/158, 55/218, 210/96, 210/321
[51] Int. Cl.......................................B01d 53/22
[58] Field of Search.............210/321, 487, 96; 55/16, 158, 55/218

[56] References Cited

UNITED STATES PATENTS

| | | | |
|---|---|---|---|
| 3,397,790 | 8/1968 | Newby et al. | 210/487 X |
| 3,554,378 | 1/1971 | Kohl | 210/321 |
| 2,478,109 | 8/1949 | Kamrath | 210/487 X |
| 3,352,779 | 11/1967 | Austin et al. | 210/321 X |
| 3,401,798 | 9/1968 | Nyrop | 210/321 |
| 1,909,308 | 5/1933 | Nugent | 210/487 X |
| 2,963,162 | 12/1960 | Shaw et al. | 210/487 |

*Primary Examiner*—John Adee
*Attorney*—Janes & Chapman

[57] ABSTRACT

A separator is provided that is particularly suited for separating gases from liquids by selective diffusion through a semipermeable membrane. The membrane forms an enclosure into which diffusate passes and is attached to a flat portion on a surface of a supporting core, so that a strong and leaktight flat seal between the membrane enclosure and the core is formed, with the enclosure interior communicating with a discharge passage in the core. A valve is provided for shutting off flow through the core whenever diffusate flow rate or viscosity exceeds a predetermined maximum.

21 Claims, 6 Drawing Figures

SEPARATOR OF THE SEMIPERMEABLE MEMBRANE TYPE

Semipermeable membrane separators have been used to remove dissolved or dispersed impurities from gases and liquids, by selectively permitting only the impurities or impurity-free fluid to diffuse through the membrane. This can be done by osmosis and/ or ultrafiltration. In osmosis, the component to which the membrane is permeable passes through the membrane from the side in which it is at a higher concentration to the opposite side. In ultrafiltration, the component to which the membrane is permeable passes through the membrane as a result of a positive fluid pressure differential across the membrane.

Processes of this nature and the devices associated therewith have had particular application in desalinating salt water and removing impurities from blood, and can be used for removing air from oil and hydraulic fluids.

In such systems, there is no substantial fluid flow through the membrane. The fluid carrying the impurities passes over one surface of the membrane while either the impurities or impurity-free fluid diffuse through to the other side. Normally, in semipermeable membrane separation processes, the rate of diffusion through the membrane is slow, and the diffusate upon reaching the other side is taken up in a carrier fluid which is discharged at a low flow rate.

In order to improve the rate and efficiency of separation, a large membrane surface area can be provided. A thin membrane is desirable, since the thinner the membrane, the more rapid the rate of diffusion through it. A large surface area also permits a greater diffusion rate. In order to provide a large surface area in a small space, the membrane can be spirally wrapped about a core, through which the diffusate is withdrawn. The core acts as a support for the structure, but due to the fragility of the membrane, it is not easy to form a durable leaktight seal between the membrane and the core. Consequently, core-type membrane separators heretofore provided have had a short life.

The sealing problem is complicated by the fact that such membrane separators often are subjected to high pressure differentials, and wide ranges of temperatures. For example, a membrane separator employed in the hydraulic system of an airplane to remove air must withstand pressure differentials as high as 250 psi. and in some cases as high as 3,000 psi. Furthermore, such assemblies are often subjected to a temperature range of −65° F. to 275° F. during operation of the plane, and must carry high oil flow volumes, of the order of 5 gpm. over the membrane surface. Leakage rates greater than 1 cc. per hour at the high flow rates through such systems could rapidly deplete the system of oil and are therefore not tolerable. Under such circumstances, it can be appreciated that all seals of the membrane must be completely leaktight since the membrane has some small oil permeability.

Resin bonding agents have been employed to form a leaktight seal to the core, but have not proved to be a complete answer to the problem. It is difficult to form leaktight bonds between the membrane and cores made of metal, since resins do not adhere well to both metal and the membrane material. Furthermore, many resins which would otherwise be suitable may be deleteriously affected by fluids used in the system.

U.S. Pat. No. 3,367,504 to Westmoreland discloses a semipermeable membrane composite coiled about a core. The core is cylindrical, and the membrane composite is bonded to the cylindrical core by epoxy resin. One edge of one of the membranes of the composite is bonded axially to the core, on one side of the core apertures, and an edge of another membrane of the composite is bonded axially along the other side of the core apertures, so that the core apertures communicate with the space between the membranes. Such a bond cannot be leaktight, since any relative movement of the core and the membranes will tend to break the seal. Moreover, all strain of the bond is taken up at the line contact between the membrane edges and the core.

Newby et al., U.S. Pat. No. 3,397,790, show that a membrane composite can be threaded through slots in a hollow core, and so deliver fluid into the core. However, although Newby et al. seal the edges of the sheets together, they do not seal the membrane sheets to the core, and thus leakage can occur.

Merten, U.S. Pat. No. 3,386,583, discloses a membrane enclosure in which the core extends into the enclosure. However, with such a configuration, it is extremely difficult to form a leaktight seal at the point at which the core emerges from the enclosure.

This invention provides a separator of the semipermeable membrane type in which a leaktight seal is provided between the membrane and the core that is extremely resistant to high pressure and temperatures, so as to perform satisfactorily for long periods of time under adverse conditions.

The semi-permeable membrane separator of the invention comprises, in combination, a semi-permeable membrane enclosure having a space therewithin for flow of material passing into and through the membrane; a core having a flat portion supporting the membrane enclosure: and a passage through the core in fluid communication with the membrane enclosure at the flat portion for discharge of material from the membrane enclosure, the membrane enclosure being attached to the flat portion of the core in a leaktight seal.

A preferred embodiment of the separator of the invention comprises, in combination, a core having a flat portion on the exterior surface thereof, and a fluid passage therethrough; an opening in the flat portion communicating with the fluid passage; and a semi-permeable membrane enclosure having an opening therein in fluid communication with the core opening, and secured in a leaktight seal against the flat portion of the core.

This invention further provides a semi-permeable membrane separator assembly having means for sensing and automatically shutting off flow of fluid from the membrane enclosure if such flow becomes abnormally high or low, such as if a leak should occur, so that the system will not be drained of fluid. This separator assembly comprises a semipermeable membrane; means for passing fluid along one surface thereof; means for drawing off fluid diffusate passing through the membrane to the other surface thereof; valve means controlling flow of fluid diffusate; and flow-sensitive sensing means operatively associated with the valve means and responsive to a predetermined change in diffusate flow rate and/ or viscosity to close the valve and thus stop diffusate flow.

The separator of the invention is particularly adapted for the separation of air and other gases from liquids such as oil and hydraulic fluid, although it can also be used to separate liquids from liquids, and liquids from gases, and gases from gases.

The separator of the invention employs a thin semipermeable membrane. The membrane can be from about 0.0005 to about 0.005 inch thick. The material of which the membrane is made is selected according to the material to be separated out by passage through the membrane. For example, if air is to be separated from oil or hydraulic fluid, an air-permeable oil-impermeable polytetrafluoroethylene membrane or fluorinated ethylene-propylene copolymer membrane is suitable. Water-impermeable air-permeable dimethyl silicone rubber membranes and silicone polycarbonate copolymer membranes can be used for separating oil from water. Water can be separated from oil or hydraulic fluid or from water having impurities therein, such as soluble salts or air, by a water-permeable nylon membrane, a water-permeable regenerated cellulose membrane, or other water-permeable membranes known to those skilled in the art. In the case of separation of water from water solution, the pure water diffuses through the membrane under a positive fluid pressure differential, leaving the soluble salts in concentrated aqueous solution on the other side of the membrane. Selected dissolved ionized materials can also be removed by use of a cation- or anion-permselective ionic membrane.

The semi-permeable membrane is in the form of an enclosure having a space therewithin for flow of diffusate to a discharge passage through the core. One form of enclosure is a closed envelope or pouch having two membrane sheets bonded together on all four edges. A single rectangular sheet can be folded, and the three open edges sealed, to form an envelope. It is possible to flatten a tubular membrane and seal the two ends, or to nest two concentrically tubular membranes, and then bond their ends so that the tubes define an annular enclosure.

The edges of the enclosure can be sealed by any means suitable to the membrane material. They can be solvent-bonded together, (if solvent soluble), heat-bonded together, (if thermoplastic), and adhesive-bonded together, such as by a resin. It is preferred, however, that a membrane made of a thermoplastic material be employed, and that the edges of the membrane enclosure be heat-bonded together to form a leak-tight seal.

The open interior of the enclosure is preferably provided with a member which spaces the membrane walls apart, and maintains an open flow space for passage within the enclosure of diffusate from the system. The spacer is preferably made of coarse plastic mesh, which can be either woven or extruded. A corrugated sheet material whose corrugations run in the same direction as flow through the enclosure is useful. Any spacer which provides a high open flow space can be used.

The interior of the membrane enclosure communicates with the discharge passage in the core, via openings formed in the membrane wall and in the core. If one opening is insufficient to accomodate the flow, several openings or a long a narrow slot or groove can be used.

The core can have any cross-sectional shape, but the sealing surface to which the membrane enclosure is attached must be flat. The core preferably is cylindrical in cross section, except for the flat portion.

The core can be a hollow tube, or a solid rod or bar, in which a bore comprising the discharge passage is provided. The discharge passage preferably runs axially in the core, to an end thereof. The discharge passage can communicate with the opening in the flat portion of the core surface via a connecting passage, but the discharge passage can be curved, or formed at an angle, so as to itself connect with the opening in the flat portion of the core surface.

The flat portion of the core can be a flat surface segment which extends lengthwise along the entire length of the core. However, the flat portion need not extend along the entire length of the core, but can comprise only the sealing surface which surrounds the opening in fluid communication with the discharge passage. If several openings are provided, only the opening in fluid communication with the discharge passage requires an abutting flat sealing surface, since the other openings can be made leaktight by sealing them off from the open space within the enclosure. There can be non-apertured flat portions on the core at different spaced locations along the length of the core, one for each location at which the membrane is to be fixed to the core.

The flat sealing surface on the core is an important feature of the invention. A flat sealing surface permits a secure and leaktight seal with the flat membrane wall at the apertures, since a planar seal can be formed. The forces which generally tend to break the seal are shear forces, which normally occur in the plane in which the bonds are formed. However, if the force which holds the seal tight is distributed over a planar surface, the adjacent portions of the seal tend to reinforce each other so as to resist any shearing stresses which might otherwise tend to break the seal. This is to be compared with the essentially point bonds which would occur on the surface of a cylinder or the like, which are all in different planes, and which do not reinforce each other significantly against shear stresses. The flat surface also provides a mating surface for flat washers.

The core can be made of metals such as aluminum, steel, stainless steel, nickel and nickel alloys, brass and the like. Plastic materials such as hard synthetic rubber, polypropylene, polyvinyl chloride, polycarbonate, polyethylene, polystyrene, Viton-A, polyurethane, nylon, polytrifluorochloroethylene, and polytetrafluoroethylene can be used.

The core can be fixed to the membrane enclosure either before or after the edges of the membrane enclosure are sealed, depending on the means employed to fix the core to the membrane enclosure. For example, the membrane separator can be fixed to the core by mechanical means, such as one or more screws, one of which is hollow and communicates with the interior of the core through the communicating openings in the core and in the membrane wall. If a single membrane sheet is used, this can be done by placing a membrane sheet on the core, so that approximately half of the sheet width extends beyond the end of the core. The sheet is then secured to the core and is then folded in half, back upon itself, and the edges sealed. Mechanical fasteners such as rivets, bolts, clips, and clamps can also be used in combination with washers to seal the membrane to the core.

The hole made by the mechanical fastener (other than the hollow fastener) is a potential source of leakage, even if leak-resistant washers are used to ensure a tight seal. To eliminate this, such holes, (other than that made for the hollow fastener) can be sealed off from the open flow-through space within the membrane enclosure by sealing both sides of the membrane together, as by a heat-seal or solvent bonding.

The membrane enclosure can also be sealed to the core, using heat-sealing, solvent-bonding or an adhesive. Such sealing can supplement or replace mechanical fasteners.

After the membrane enclosure is sealed to the core, the enclosure is wrapped or folded into a shape which provides a high membrane area in a small volume. This can be done for example by winding membrane enclosure in a spiral about the core. The membrane enclosure, however, can be folded into a series of corrugations or convolutions. In each of these instances, it is preferred to place a second spacer between the adjacent windings or corrugations to maintain an open flow space therebetween. These spacers can be a corrugated sheet, coarse mesh, or any other material having a high open area.

In the preferred embodiment, a series of openings or apertures, preferably five, are provided in the membrane. The apertures are arranged in a row, in spaced positions, such that when the membrane is folded over, the apertures will be aligned with a registering pair of apertures provided at each side of the enclosure and a single aperture opening only to the inside of the enclosure intermediate the registering pairs of apertures. The core has three aligned apertures with corresponding abutting flat surfaces of which the middle one connects with the discharge passage of the core.

It is to be noted that the core can be fixed to the membrane enclosure either at a central location or at an end thereof.

In order to assemble the membrane and the core into a unit, the membrane is laid over the core, such that the three apertures in the core register with the three apertures in the membrane. A hollow screw with a sealing washer is then placed through the middle aperture in the membrane which registers with the aperture in the flat sealing surface communicating with the discharge passage. A coarse drainage member having corresponding apertures is placed over the membrane, and the membrane is then folded over so that the remaining apertures in the membrane are aligned with each other. A screw and a plastic washer are then inserted through each pair of registering apertures, and tightened into place, to fix the sheet to the core and seal it against leakage. The edges of the membrane are then sealed, to form the enclosure.

If a plastic core is used, the same procedure can also be employed. However, it is also possible to solvent- or heat-bond the enclosure to the core, if the core is of the same as or a closely related material to the membrane material. The procedure for bonding the core to the membrane enclosure is similar to the above, with the exception that only one aperture in the core and in the membrane enclosure is required. The membrane can be bonded directly to the flat surface of the core, while the aperture in the enclosure is in registering position with the aperture in the core, so as to fix the membrane sheet to the core, and seal the enclosure to the core about the registering apertures to prevent leakage.

The composite of the core and the membrane enclosure coiled about it can be fitted within a cylindrical container, so as to form a cartridge. One end of the cartridge can be provided with means such as an end cap for closing off one open end of the cartridge, and supporting the cartridge in a leak-tight fit in the housing. The other end of the cartridge can remain open for influent flow.

This invention further provides a means for shutting off flow through the discharge port passage if a change in the magnitude or viscosity of the discharge flow occurs. This is important, if for example, a leak in the membrane occurs, since the liquid being purified would pass through the membrane and proceed into the core and out the discharge passage. If this were to occur and remained unchecked the system could be rapidly drained of liquid. The shut-off device of the invention is provided to prevent this from happening. The shut-off device comprises a flow-sensitive sensing means associated with a valve positioned in the discharge flow line. The valve is moveable between first and second positions. In its first position, the valve permits flow to pass through the discharge flow line, and in its second position the valve closes off the line.

The valve moves between its first and second positions in response to a change in the magnitude or viscosity of the diffusate flow. This is accomplished by a flow-sensitive sensing means. The flow-sensitive sensing means is operatively connected to the valve to open and close the valve is response to flow changes. The flow-sensitive sensing means comprises a flow-responsive member such as a piston, a diaphragm, a bellows or the like, having pressure surfaces exposed to and sensing both upstream and downstream pressure, and a flow-restricting passage such as a capillary or narrow bore which is in the line of flow in the discharge line, and communicates with the upstream and downstream pressure surfaces so that the flow responsive member is exposed to and thus senses any pressure differential created by flow through the flow-restricting passage. The flow-restricting passage makes the flow-responsive member sensitive to high flow volumes, and changes in the viscosity of flow. The flow-restricting passage provides a laminar flow path through which the diffusate flow must pass. As it does so, a pressure differential is created which is related to the magnitude and viscosity of the flow through the passage. The upstream and downstream valve surfaces are exposed to this pressure differential. A bias means such as a spring is positioned so as to bias the valve away from its second position, so that fluid is free to flow through the discharge flow line. The bias force acting on the valve is adjusted so that under normal flow conditions this pressure differential is ineffective to actuate the valve, and thus the valve remains open and permits this discharge flow to pass through the discharge line.

If, however, an increase in flow volume or viscosity occurs, the pressure differential across the flow-restricting passage also increases. When a sufficient predetermined pressure differential due to flow is reached, the bias force is overcome, and the valve moves into its second position, in which it closes off flow through the discharge line.

Figure 3:
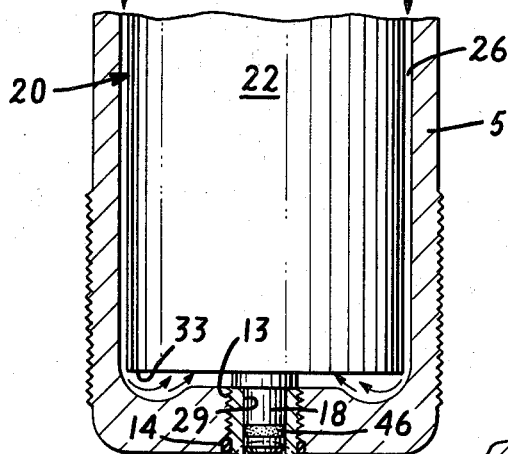
Figure 3:
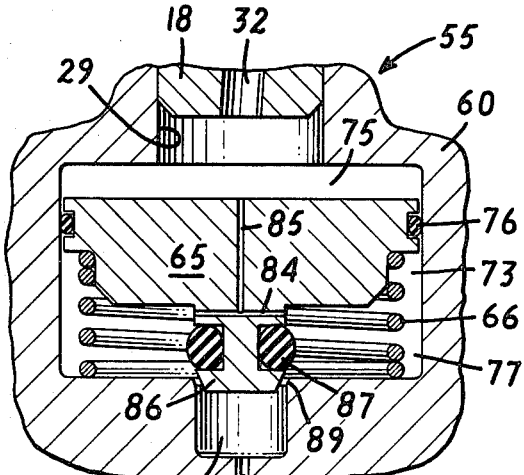
Figure 6:
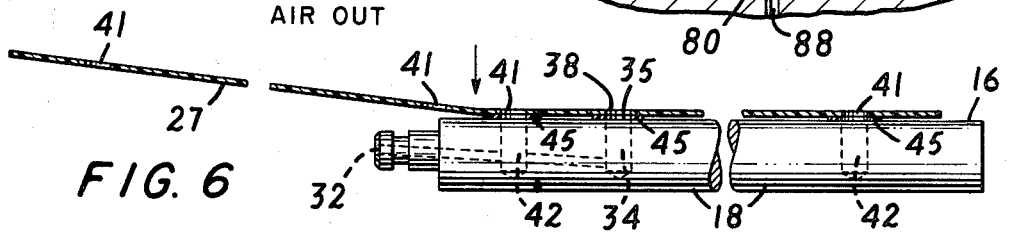
Figure 2:
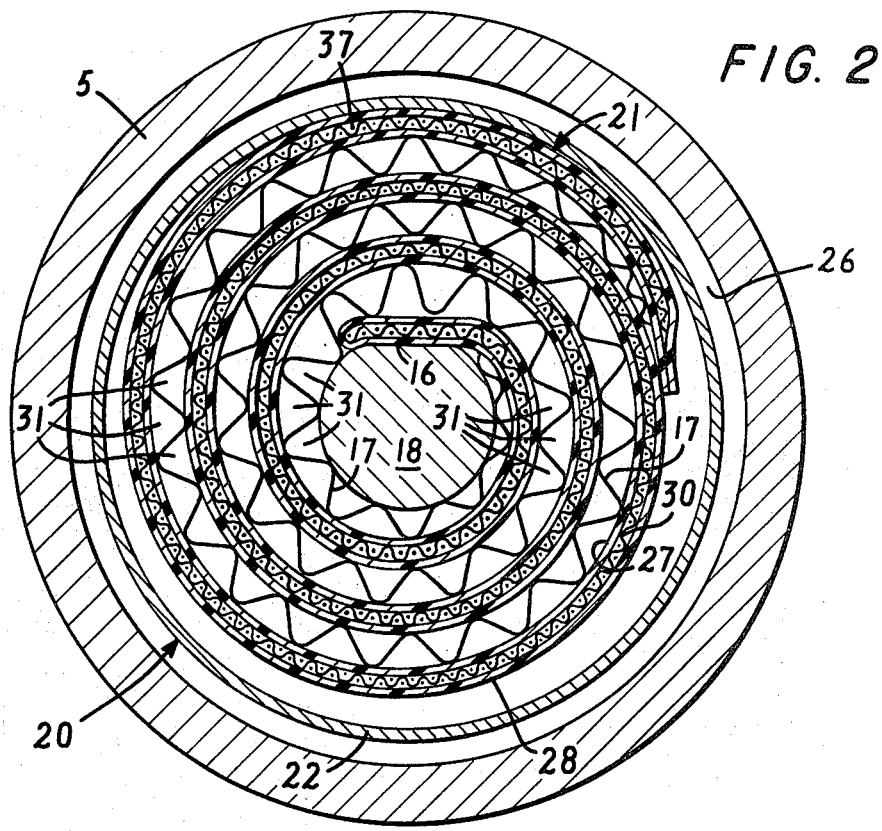
Figure 4:
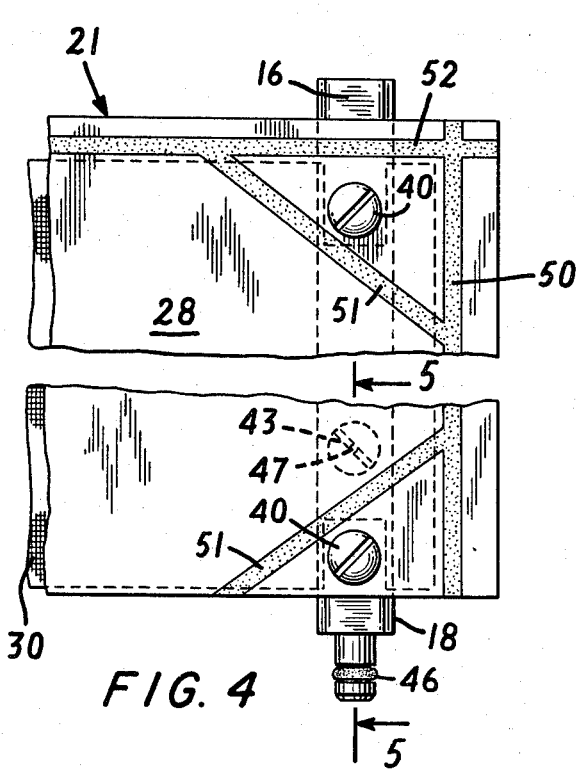
Figure 5:
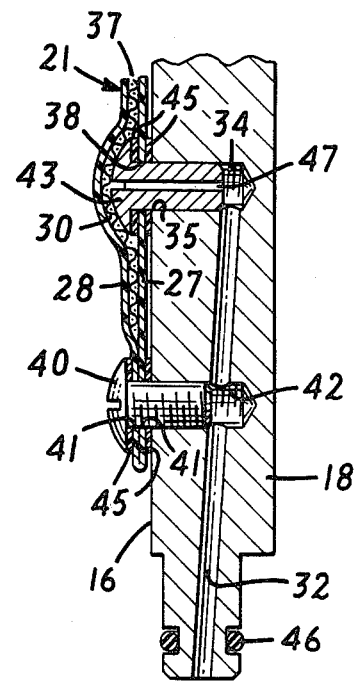

Other features of the invention which will apparent from the description of the preferred embodiment of the invention, as shown in the drawings, in which:

FIG. 1 is a view partly in a cross section and partly broken away of a separator in accordance with the invention, FIG. 2 is a cross-sectional view taken along the line 2—2 of FIG. 1, FIG. 3 is an enlarged view in cross-section of the portion so marked of FIG. 1, showing the shut-off mechanism, FIG. 4 is a plan view of the membrane envelope of FIG. 1, showing how it is fixed to the core, FIG. 5 is a view in cross-section taken along the line 5—5 of FIG. 4, and FIG. 6 is a view of the membrane envelope of FIG. 1, partially assembled to a core.

The membrane assembly shown in FIG. 1 comprises a housing 3 having a head portion 4 and a bowl portion 5 threaded in the head portion. The head portion 4 has an inlet port 7, through which fluid to be purified containing membrane-permeable components enters the housing, and an outlet port 8 through which the purified fluid leaves the housing. The inlet port 7 leads into an inlet passage 9 which opens into the bowl portion 5, and the outlet port 8 is at the end of an outlet passage 10, which communicates with the bowl portion via a centrally formed dependent portion 12 of the head. The inlet passage 9 and the outlet passage 10 are connected directly via a bypass relief passage (not shown). Flow through this bypass passage is normally closed off by a pressure-responsive relief valve 15 at the outlet end of the bypass passage. This valve opens to permit flow to proceed through the bypass passage whenever a predetermined pressure differential between the inlet passage 9 and the outlet passage 10 is reached.

Mounted in the bowl portion 5 is a separator 20 of the invention, which comprises a coiled semi-permeable membrane enclosure 21 (best seen in cross-section by reference to FIG. 2) mounted on a core 18. The membrane separator enclosure 21 is confined within a metal cylinder 22. The top end of this cylinder is closed off by an end cap 23, having a flange 25 abutting a shoulder 19 on the dependent portion 12, to axially position the separator 20 in the bowl, and capture an O-ring 24. The O-ring 24 seals against the dependent portion 12 of the housing, and thereby prevents fluid from bypassing the membrane separator assembly 20.

The bottom of bowl 5 is provided with a port 13 into which is threaded a shut-off valve assembly 55, which is described later. An O-ring 14 seals the assembly 55 against leakage from the bowl via port 13.

Membrane enclosure 21 is formed of two membrane walls 27 and 28 of a Teflon membrane 0.001 inch in thickness. A plastic mesh spacer 30 between the layers 27 and 28 defines an interior flow space 37 between the membrane walls into and through which the diffusate passes. One wall 27 of the membrane enclosure 21 is fixed to a flat surface 16 formed on the core 18, and the membrane enclosure is coiled about the core. The windings of the membrane enclosure are spaced apart by a corrugated aluminum spacer 17, which defines flow channels 31 for fluid flow along the surfaces of the membrane.

Fluid entering the inlet port 7 passes through the inlet passage 9 and down through the space 26 defined between the inside wall of the bowl 5 and the cylinder 22, to the bottom open end 33 of the cylinder. Fluid then passes into the coiled membrane separator assembly 20 in the open spaces 31 between the windings of the membrane enclosure 21.

The core 18 has a central discharge passage 32 formed therein (best seen in FIG. 3). The passage rungs lengthwise in the core, and terminates at one end thereof. The passage 32 also communicates with the flat sealing surface 16 of the core via a bore 34 which terminates in an opening 35 in the flat surface of the core, as can be seen in FIG. 5. The interior flow space 37 of the membrane enclosure 21 communicates with opening 35 via an opening 38, formed in the facing membrane wall 27.

The membrane enclosure is held to the core by three screws 40,43 which pass through corresponding openings formed in the membrane walls. The screws fit into threaded bores 42, 34, in the flat surface 16 of the core 18 and hold the enclosure 21 in position. The two end screws 40 pass through pairs of openings 41 formed in the membranes walls 27 and 28, and into bores 42 in the core. Teflon washers 45 are provided on both sides of the membrane walls to prevent any possible leakage around the screws when the screws are tightened. Additionally, the screws 40 are isolated from the remainder of the membrane enclosure 21 by heat seals 51.

The intermediate screw 43 fits through the aperture 38 in the membrane wall 27. This screw has a central passage 47 therethrough and is threaded into the bore 34 which communicates with the central passage 32. The screw 43 therefore communicates with the inside 37 of the envelope, and the screw when tightened against the membrane 27 and the flat surface 16 of the core forms a leaktight seal between the membrane and the core. Thus, fluid from the interior of the membrane envelope can pass into and through the discharge end of the core via the central passage 47 in the screw 43, the bore 34, and the passage 32. Leakage is prevented in this case also by Teflon washers 45 positioned on each side of the membrane wall 27.

The membrane enclosure is assembled on the core as follows with reference to FIGS. 4, 5, and 6. A rectangular sheet of membrane material 27 is provided with four openings 41 and one opening 38, which are spaced such that when the membrane 27 is folded longitudinally in half, two pairs of openings 41 register with each other, and the remaining opening 38 is positioned intermediate the registering pairs of openings. Teflon washers are placed on the flat surface 16 over each of the bores 42 and 34, and the membrane sheet 27 is then laid over the core such that two of the openings 41 and the opening 38 are in registering positions with the three bores 42, 34 in the core. The opening 38 registers with the bore 34 in the flat surface and the openings 41 are in registering position with two of the bores 42. The screw 46 is then placed through a Teflon washer 45, and the washer and screw are then placed through the opening 38 in the sheet and threaded into the bore 34. A mesh spacer sheet 30, which is just less than half of the width of the membrane (and just less than the width of the folded membrane) is then placed over the portion of the membrane which is on the core, and then the membrane is folded in half so that the remaining openings 41 are in registering positions with the bores 42. Two screws 40 with Teflon washers 45 thereon are then placed through the pairs of registering openings 41 in the membrane, and are tightened against the flat surface of the core to firmly hold the membrane in position. A heat seal 50 is then formed across each open end of the membrane enclosure and another heat seal 52 is formed along the side edge of the membrane enclosure to complete the leaktight separator enclosure 21. A sheet of corrugated spacing material 17 is then placed over the membrane enclosure, and the composite is then coiled about the core and fitted within the cylinder 22, to form the membrane separator assembly 20. An O-ring 46 is placed over the end of core 18. The assembly is then placed in the bowl with the end of the core 18 a port 29 of the valve assembly 55 attached at the bottom of the bowl portion of the housing.

In operation, fluid to be purified enters the housing through the inlet 7, passes through the inlet passage 9 into the space 26, and proceeds to the bottom open end 33 of the separating assembly 20. The fluid the proceeds upwardly through the flow spaces 31 between the windings of the coiled enclosure. As the fluid flows along the surface of the membrane walls 27 and 28 of the enclosure, the material to which the membrane is permeable diffuses through the membrane. The fluid which does not pass through the membrane leaves the assembly through the passage 10 and the outlet 8. The material which diffuses through the membrane walls flows as diffusate into and through the flow space 37 between the walls 27 and 28 of the enclosure 21, and passes through the passage 47 in the screw 43 into the passage 32 in the core, and enters valve 55 via port 29.

If a blockage in the flow spaces 31 should occur, or fluid viscosity increases, as in low temperature operation, the pressure differential between the inlet 7 and the outlet 8 will increase. When the pressure differential reaches a predetermined maximum, the relief valve 15 opens, permitting fluid to pass from the inlet directly to the outlet, bypassing the separator 20.

The shut-off valve assembly 55, mounted at the bottom of the bowl, comprises a housing 60 having a chamber 73 in which a flow-responsive piston 65 is reciprocably movable. The bottom of the chamber 73 is formed with a well 80, and an outlet passage 88. The piston 65 is biased by a spring 66 away from the well 80. The piston 65 has a peripheral sealing ring 76, which divides the chamber 73 into two parts 75 and 77. Port 29 carries diffusate flow to chamber section 75. The outlet passage 88 carries flow from chamber section 77. A capillary passage 85 through the piston carries flow from chamber 75 via cross drilled hole 84 into chamber 77. The capillary passage 85 is dimensioned so as to provide a laminar flow path through the flow-responsive piston 65. A force occurs across piston 65 as a result of the pressure differential produced by the fluid passing through the passage 85. The spring 66 under normal conditions offsets this force and therefore prevents the piston 65 from moving into its seated position in well 80.

The valve stem 86 on the bottom of the piston 65 is encircled by sealing ring 87. In the open position shown, an annular space 89 is left between the stem 86 and the edge of the well 80, through which flow proceeds to the outlet passage 88.

The valve stem 86 and the sealing ring 87 are adapted to move reciprocably into and out of the well 80, depending on the flow through the valve 55. The well 80 constitutes a valve seat, so that the ring 87 forms a tight seal against the walls of the well 80. This prevents fluid from passing from the chamber 77 to the outlet passage 88 when the stem 86 moves into the well 80. The outlet passage 88 communicates with a fitting 90 (see FIG. 1) for a connection to the atmosphere. An orifice 92 is provided in the fitting so as to ensure a back pressure in the assembly and prevent false actuation of the valve when exhausting to low absolute pressure. A filter (not shown) protects orifice 92 from plugging.

In operation, under normal conditions diffusate discharged from the separator proceeds from port 29 into and through chamber 75, capillary 85, and hole 84, into the chamber 77. Diffusate then proceeds through the annular space 89, well 80 and outlet passage 88, orifice 92, and fitting 90. If the diffusate flow rate or viscosity increases, the force across piston 65 increases as a function of the increased flow rate or viscosity. When the force reaches a predetermined value, and exceeds the force of the spring 66, the piston 65 moves the stem 86 and the sealing ring 87 into the well 80, to close off the annular space 89, thereby shutting off the flow to the outlet passage 88.

The above separator is particularly useful in the separation of air from oil or hydraulic fluid. Normally, the air and a small amount of liquid passes through the membrane and the shutoff valve 55 is sized to accumulate this normal flow of fluid without shutting off. If the fluid flow increases abnormally, such as if the membrane breaks, the valve 55 senses the increased liquid flow (as opposed to gas flow) and shuts off flow, preventing further loss of liquid and thus preventing drainage of the oil or hydraulic fluid from the system.

What is claimed is:

1. A semipermeable membrane separator comprising, in combination, a semipermeable membrane sheet in the form of an enclosure having a space therewithin for flow of material passing through the membrane and an opening therein in fluid communication with the space; a supporting core for the membrane enclosure, the core having an external flat portion on a surface thereof to which the membrane sheet in the portion surrounding the opening is attached in a leaktight seal flat against the external surface of the core and in the plane of the core; and a fluid passage in the core in fluid communication via the opening in the membrane enclosure with the space within the membrane enclosure for discharge of material therefrom that passes through the membrane into the membrane enclosure.

2. A separator in accordance with claim 1, in which the membrane enclosure is secured to the core by a screw passing through the membrane sheet and sealed off from the space within the membrane enclosure to prevent leakage.

3. A separator in accordance with claim 2, in which the membrane enclosure communicates with the core via a screw having a central passage therethrough.

4. A separator in accordance with claim 1, in which the membrane enclosure has a spacer therein.

5. A separator in accordance with claim 1, in which the membrane enclosure is wound about the core.

6. A separator in accordance with claim 5, in which the windings of the membrane enclosure are separated by a spacer.

7. A separator in accordance with claim 6, in which the spacer is corrugated.

8. A separator in accordance with claim 1, in which the membrane sheet material is folded to form a membrane enclosure having one folded side and three open sides and heat sealed together at its three open sides to form the membrane enclosure.

9. A separator in accordance with claim 1, in which the membrane enclosure is sealed to the flat portion of the core surface by a fastener having a passage therethrough, said passage connecting the interior of the enclosure with the discharge passage in the core.

10. A separator in accordance with claim 1, in which the membrane enclosure is sealed to the flat portion of the core surface by an adhesive.

11. A separator in accordance with claim 1, in which the membrane enclosure is heat sealed to the flat portion of the core surface.

12. A separator in accordance with claim 1, in which the membrane enclosure is solvent-sealed to the flat portion of the core surface.

13. A separator in accordance with claim 1, in which the core has an axial flow passage and a radial flow passage in fluid communication therewith and terminating in an opening in the flat portion of the core communicating with the opening in the membrane enclosure and communicating the interior of the enclosure with the axial core passage.

14. A separator in accordance with claim 1, comprising a housing having a fluid inlet, a fluid outlet, and a discharge port for membrane-permeable material; and a cannister supporting a separator in accordance with claim 1, and positioned in the line of fluid flow from the inlet to the outlet, such that fluid entering the housing enters the cannister via the fluid inlet and flows along the membrane enclosure, fluid that does not flow through the membrane proceeding to the outlet, while membrane-permeable material diffuses through the membrane into the space within the membrane enclosure and thence through the opening therein for discharge from the assembly via the core passage and discharge port.

15. A separator assembly in accordance with claim 14, including means for shutting off flow through the discharge port if a predetermined increase in viscosity or flow volume occurs.

16. A separator in accordance with claim 1, comprising valve means associated with the core passage and controlling diffusate flow of membrane-permeable and controlling diffusate flow of membrane-permeable material.

17. A separator in accordance with claim 16, comprising flow-sensitive sensing means operatively associated with the valve means and responsive to a predetermined change in diffusate or viscosity flow volume to close the valve and stop diffusate flow.

18. A separator assembly in accordance with claim 17, in which the flow-sensitive sensing means comprises a flow-restricting passage and a flow-responsive member having pressure surfaces exposed to the pressure differential through the passage.

19. A separator assembly in accordance with claim 18, in which the flow restricting passage is a capillary passage connecting the pressure surfaces of the flow-responsive member.

20. A separator assembly in accordance with claim 18, in which one flow-responsive member is a piston associated with the valve means, and bias means holding the valve in an open position until the flow volume or viscosity exceeds a predetermined maximum.

21. A separator in accordance with claim 16, comprising an orifice in the passage in the core, adapted to prevent false actuation of the valve means when exhausting to low absolute pressures.

* * * * *